US010021108B2

(12) United States Patent
Mankovskii

(10) Patent No.: US 10,021,108 B2
(45) Date of Patent: Jul. 10, 2018

(54) ANOMALY DETECTION FOR ACCESS CONTROL EVENTS

(71) Applicant: CA, INC., New York, NY (US)

(72) Inventor: Serge Mankovskii, San Ramon, CA (US)

(73) Assignee: CA, INC., New York, NY (US)

(*) Notice: Subject to any disclaimer, the term of this patent is extended or adjusted under 35 U.S.C. 154(b) by 0 days.

(21) Appl. No.: 14/515,782

(22) Filed: Oct. 16, 2014

(65) Prior Publication Data
US 2016/0112397 A1    Apr. 21, 2016

(51) Int. Cl.
*G06F 7/04* (2006.01)
*G06F 15/16* (2006.01)
*G06F 17/30* (2006.01)
*H04L 29/06* (2006.01)

(52) U.S. Cl.
CPC ........ *H04L 63/107* (2013.01); *H04L 63/0263* (2013.01); *H04L 63/105* (2013.01)

(58) Field of Classification Search
CPC ......... H04L 67/10; H04L 63/20; H04L 63/10; H04L 63/0263; H04L 63/101; G06F 21/31; H04W 12/06; H04W 12/08
USPC .......................................... 726/1, 6; 709/229
See application file for complete search history.

(56) References Cited

U.S. PATENT DOCUMENTS

| | | | | |
|---|---|---|---|---|
| 7,716,740 B2 * | 5/2010 | Robert | ................ | H04L 63/1408 455/410 |
| 8,522,305 B2 * | 8/2013 | Cho | ........................ | G06F 21/41 726/1 |
| 8,544,072 B1 * | 9/2013 | Masone | ............... | H04L 63/0815 726/10 |
| 8,683,547 B2 * | 3/2014 | Apparao | ................ | G06Q 10/06 705/304 |
| 8,751,801 B2 * | 6/2014 | Harris | ..................... | G06F 21/31 713/168 |
| 9,003,488 B2 * | 4/2015 | Spencer | .................. | H04W 8/22 726/3 |
| 9,420,002 B1 * | 8/2016 | McGovern | ............. | H04L 29/06 726/1 |
| 2003/0154293 A1 * | 8/2003 | Zmolek | ................... | H04L 63/08 709/228 |

(Continued)

*Primary Examiner* — Oleg Korsak
*Assistant Examiner* — Feliciano S Mejia
(74) *Attorney, Agent, or Firm* — Vierra Magen Marcus LLP

(57) ABSTRACT

Methods for managing access to protected resources within a computing environment and detecting anomalies related to access control events are described. An access control system may acquire a request for access to a protected resource, identify a username associated with the request, acquire contextual information associated with the request for access (e.g., a time of day associated with a location of a device making the request), acquire a baseline set of rules for the username, detect a deviation from the baseline set of rules based on the contextual information, acquire additional authentication information in response to detecting the deviation, authorize access to the protected resource based on the additional authentication information, generate a record of the request for access including the contextual information, and update the baseline set of rules if an intrusion to the access control system has not been detected within a threshold period of time.

18 Claims, 6 Drawing Sheets

(56) References Cited

U.S. PATENT DOCUMENTS

| | | | |
|---|---|---|---|
| 2007/0136807 A1* | 6/2007 | DeLiberato | G06F 21/55 726/22 |
| 2013/0305357 A1* | 11/2013 | Ayyagari | H04L 63/14 726/22 |
| 2014/0053250 A1* | 2/2014 | Wethington | H04L 63/10 726/5 |
| 2014/0059686 A1 | 2/2014 | Lin | |
| 2014/0266680 A1 | 9/2014 | Libal | |
| 2014/0310779 A1* | 10/2014 | Lof | H04L 63/0421 726/4 |
| 2014/0355592 A1* | 12/2014 | Camps | H04W 4/023 370/338 |

* cited by examiner

US 10,021,108 B2

ANOMALY DETECTION FOR ACCESS CONTROL EVENTS

BACKGROUND

The present disclosure relates to managing access to resources within a computing environment and to detecting anomalies related to access control events.

A computing environment may provide access to protected resources (e.g., networks, servers, storage devices, files, and computing applications) based on access rights (e.g., read, write, create, delete, or execute rights) that are tailored to particular users of the computing environment (e.g., a particular employee or a group of users that are identified as belonging to a particular group or classification). An access control system may perform various functions for managing access to resources including authentication, authorization, and auditing. Authentication may refer to the process of verifying that credentials provided by a user or entity are valid or to the process of confirming the identity associated with a user or entity (e.g., confirming that a correct password has been entered for a given username). Authorization may refer to the granting of a right or permission to access a protected resource or to the process of determining whether an authenticated user is authorized to access a protected resource. Auditing may refer to the process of storing records (e.g., log files) for preserving evidence related to access control events. In some cases, an access control system may manage access to a protected resource by requiring authentication information or authenticated credentials (e.g., a valid username and password) before granting access to the protected resource. For example, an access control system may allow a remote computing device (e.g., a mobile phone) to access a protected resource, such as a file, webpage, application, or cloud-based application, via a web browser if valid credentials are provided to the access control system.

BRIEF SUMMARY

According to one aspect of the present disclosure, technology for managing access to resources within computing environments and for detecting anomalies related to access control events is disclosed.

Technology is described managing access to protected resources (e.g., networks, servers, processors, storage devices, databases, files, and computing applications) and for detecting anomalies related to access control events. An access control event may comprise a request for access to a protected resource. In some embodiments, an access control system may acquire a request for access to a protected resource within a computing environment, identify a username associated with the request, authenticate the username, acquire contextual information associated with the request for access (e.g., the contextual information may comprise an identification of the device making the request, an identification of the operating system used by the device making the request, a location of the device making the request, a time of day associated with the location of the device making the request, or whether a particular cookie is stored on the device making the request), acquire a baseline set of rules for the username (e.g., determined based on a prior history of access requests made by the username), detect a deviation from the baseline set of rules based on the contextual information (e.g., a deviation may comprise a known device requesting access to the protected resource from a new location or from a new network), acquire additional authentication information in response to detecting the deviation, authorize access to the protected resource based on the additional authentication information, generate a record of the request for access including the contextual information in response to detecting the deviation, and update the baseline set of rules if an intrusion or attack to the access control system has not been detected within a threshold period of time subsequent to authorizing access to the protected resource.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying Figures with like references indicating like elements.

DETAILED DESCRIPTION

Figure 1:
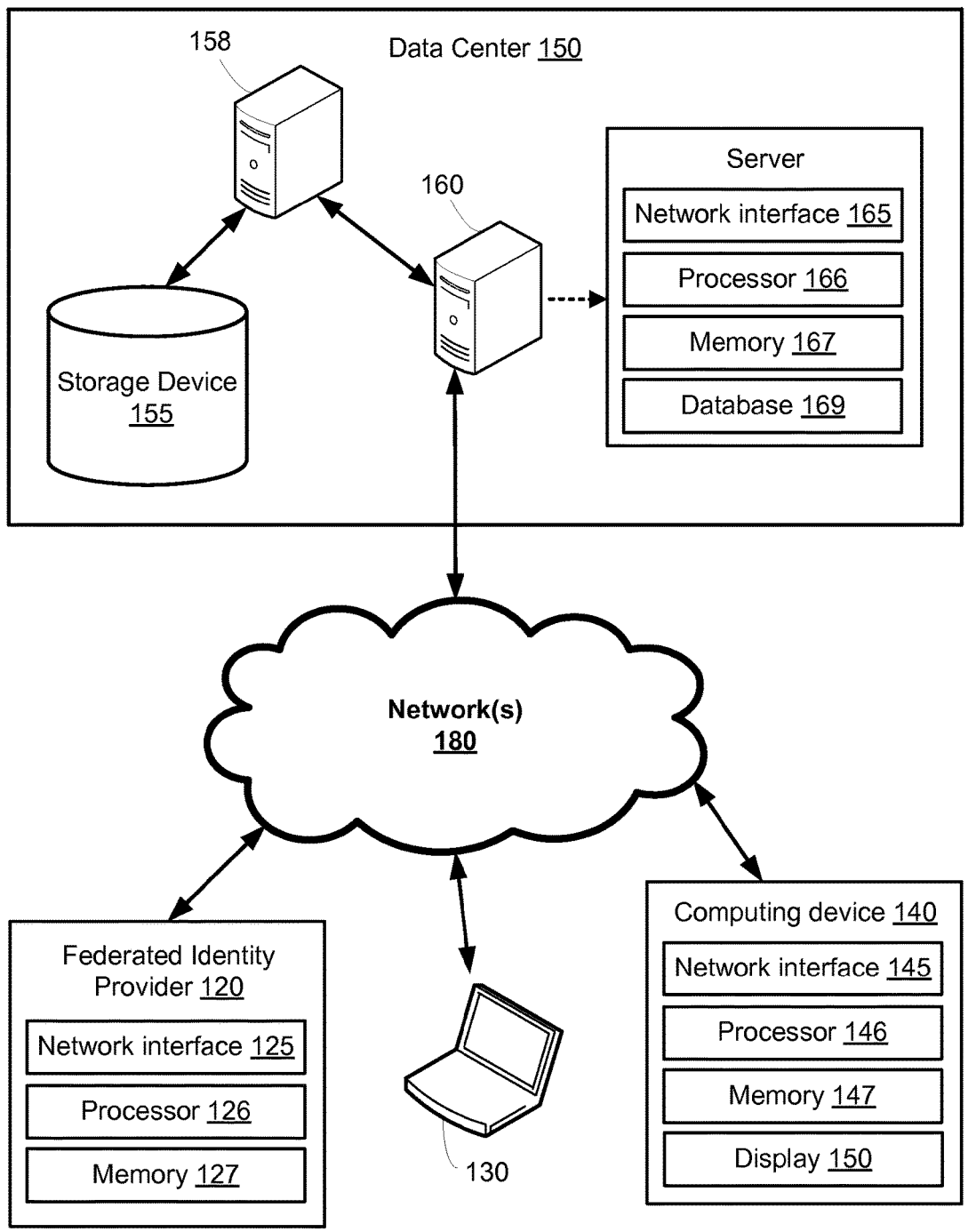
FIG. 1 depicts one embodiment of a networked computing environment.

As will be understood by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET or the like, conventional procedural programming languages, such as the "C" programming language, Visual Basic, Fortran 2003, Perl, Python, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Technology is described for managing access to protected resources (e.g., networks, servers, processors, storage devices, databases, files, and computing applications) within a computing environment and for detecting anomalies related to access control events. An access control event may comprise a request for access to a protected resource. In one example, an access control event may comprise a request to access a protected application or to execute the protected application. In another example, an access control event may comprise a request to access data from a protected database or to read data from the protected database. In another example, an access control event may comprise a request to access a protected file stored on a storage device or a request to download a file from a server. An anomaly related to an access control event may comprise a deviation from prior user behavior (e.g., an end user is requesting access to a protected resource for the first time late at night) or a change in user context (e.g., an end user is requesting access to a protected resource for the first time from a new location or using a new network connection) from a baseline set of rules associated with a username. The baseline set of rules associated with a username may be generated using machine learning techniques applied to prior access requests made by or on behalf of the username.

In some embodiments, an access control system may acquire a request for access to a protected resource within a computing environment, identify a username associated with the request, authenticate the username, acquire contextual information associated with the request for access (e.g., the contextual information may comprise an identification of the device making the request, an identification of the operating system used by the device making the request, a location of the device making the request, a time of day associated with the location of the device making the request, or whether a particular cookie is stored on the device making the request), acquire a baseline set of rules for the username (e.g., determined based on a prior history of access requests made by the username), detect a deviation from the baseline set of rules based on the contextual information (e.g., a deviation may comprise a known device requesting access to the protected resource from a new location or from a new network), acquire additional authentication information in response to detecting the deviation, authorize access to the protected resource based on the additional authentication information, generate a record of the request for access including the contextual information in response to detecting the deviation, and update the baseline set of rules if an intrusion or attack to the access control system has not been detected within a threshold period of time subsequent to authorizing access to the protected resource. An intrusion may be detected via an intrusion detection system, which may monitor network or system activities for malicious activities or policy violations. The intrusion detection system may comprise an anomaly-based intrusion detection system.

In some cases, an access control system may restrict or control access to a resource within a computing environment based on contextual information associated with an access request and a set of baseline rules corresponding with a username from which the access request originates. The contextual information may include a type of web browser used for requesting access, cookie information stored on a requesting device (e.g., a tracking cookie, a browser cookie, or an HTTP cookie that was stored on the requesting device in response to a previous access request), a type of operating system used by the requesting device, an identification of the requesting device, a location of the requesting device, and a time of day associated with the location of the requesting device. The set of baseline rules may be generated based on a history of prior access requests made by the username. In some cases, machine learning techniques may be applied to contextual information associated with prior access requests made by the username (e.g., contextual information covering the past two weeks or the past two months of access requests may be used as the training data). The access control system may utilize a matrix, linked list, or mapping table data structure that maps access rights to usernames in order to determine whether a particular username is authorized to access the resource. In one embodiment, the access control system may determine whether to authorize access to a protected resource based on the contextual information and a baseline set of rules derived from previous access requests made by the username over a prior period of time (e.g., the baseline set of rules may be refreshed every month or regenerated every three months).

In some embodiments, an access control system may be enhanced with the ability to collect and log contextual information regarding access control events and to detect anomalies or deviations from the baseline set of rules based on the contextual information (e.g., detect that an access request for the resource originated from a new location or a new network not previously used). The detection of a deviation from the baseline set of rules may be performed prior to access being authorized to the protected resource or subsequent to access being authorized to the protected resource (e.g., auditing log files may be analyzed to detect the deviation after access has already been granted to the protected resource).

In some cases, after a deviation has been detected, the access control system may update the baseline set of rules to incorporate updated contextual information. In one example, if an intrusion or attack on the access control system is not detected, then the baseline set of rules may be updated to include a new location from which an access request has occurred or to include a new device from which an access request has occurred. However, if an intrusion or attack on the access control system is detected (e.g., via an intrusion monitoring system), then audit log files storing contextual information associated with access control events may be processed or analyzed to identify suspect devices, networks, or usernames. Once the suspect devices, networks, or usernames have been identified, then the baselines rule sets associated with a plurality of usernames may be updated to prevent access to protected resources from the suspect devices, networks, or usernames.

In some cases, if a deviation has been detected prior to access being authorized to a protected resource, then an additional authentication challenge request may be transmitted to a requester and a correct answer to the additional authentication challenge must be provided by the requester prior to access being granted to the protected resource (e.g., an additional challenge-response authentication procedure may be required before access is granted to the protected resource). An authentication challenge request may comprise a challenge question. In one example, if a laptop computer or mobile phone has been stolen from an employee by an adverse party, then the adverse party may attempt to access the protected resource using a computing device that is commonly used by the employee to access the protected resource and the computing device may include automatically filled-in or easily accessible username and password information for accessing the protected resource. However, if the stolen computing device is requesting access from a new location or from a new network that has not previously been used by the employee, then the access control system may transmit an additional challenge to the computing device (e.g., the access control system may request additional authentication information or for the answer to a challenge question such as the city of birth, the birthday date, or the date of hire for the employee). If a correct answer is provided by the computing device, then access may be granted to the protected resource.

In one embodiment, an access control system (e.g., used to protect access to information for an online bank account system or a cloud-based email system) may detect anomalies or deviations in the circumstances surrounding access to protected resources associated with a username by mining or analyzing contextual information stored in log files associated with previous access requests by the username. In some cases, a coupling between an access control system, anomaly detection system, and multifactor authentication system, may be used for detecting anomalies and updating baselines rules corresponding with usernames. The coupling may allow for retrofitting of existing access control systems into more complex multifactor authentication systems with anomaly detection without requiring modification to the existing access control system itself.

One benefit of automatically detecting anomalies related to access control events is that access control for protected resources may be made more secure. The improved security may derive from enforcing additional multi-factor authentication upon detection of an anomaly or updating baseline sets of rules corresponding with usernames with potential access to the protected resources to reflect changes in user behavior during access requests. These improvements may allow an access control system to restrict access to protected resources when a computing device (e.g., a cell phone or laptop) is stolen and includes automatically filled-in or easily accessible username and password information for accessing the protected resources. Furthermore, these improvements may allow an access control system to restrict access to protected resources even though an improper authentication has occurred (e.g., when federated authentication has improperly authenticated a username).

Federated authentication may allow a username to access resources, such as a Software-as-a-Service (SaaS) application, in a second domain using an authentication that occurred previously in a first domain, thereby facilitating single sign-on capability for the username. The Lightweight Directory Access Protocol (LDAP) may be used to provide single sign-on capability, wherein a single password for a username is shared between multiple services or across multiple security domains. Federated authentication may allow the authentication of user credentials by a first system to be used by a second system different from the first system by passing a security token from the first system to the second system. In this case, the authentication of user credentials performed by the first system may be used by the second system without the second system having to perform authentication of the user credentials (i.e., the second system may rely on or trust the authentication performed by the first system in order to grant access to protected resources on the second system). In one example, the authentication of a username for acquiring access to an online email application delivered from a first security domain may be used for acquiring access to a social media application delivered from a second security domain. In another example, the authentication of a username for acquiring access to protected resources within a computing environment may be performed by a third party via federated authentication (e.g., the authentication may be performed by a different company or an entity located outside of the computing environment). In some cases, information about users or usernames may be communicated from an origin site using an XML framework for exchanging authentication and authorization information between computing systems, such as the Security Assertion Markup Language (SAML).

FIG. 1 depicts one embodiment of a networked computing environment 100 in which the disclosed technology may be practiced. Networked computing environment 100 includes a plurality of computing devices interconnected through one or more networks 180. The one or more networks 180 allow computing devices and/or storage devices to connect to and communicate with other computing devices and/or other storage devices. As depicted, a federated identity provider 120, a mobile device 130, a computing device 140, and a data center 150 are in communication with each other via one or more networks 180. The data center 150 includes a server 160 (e.g., an edge server) in communication with a server 158 (e.g., an application server) that is in communication with a storage device 155 (e.g., a network-attached storage device). In some cases, the storage device 155 may comprise a hard disk drive, a magnetic tape drive, or a solid-state drive. In some embodiments, the networked computing environment may include other computing and/or storage devices not shown. For example, a data center may include thousands of servers and/or data storage devices in communication with each other. The data storage devices may comprise a tiered data storage infrastructure (or a portion of a tiered data storage infrastructure). In some cases, a tiered data storage infrastructure may include redundant arrays of independent disks and/or storage area networks.

The one or more networks 180 may include a secure network such as an enterprise private network, an unsecure network such as a wireless open network, a local area network (LAN), a wide area network (WAN), and the Internet. The one or more networks 180 may include a cellular network, a mobile network, or a wireless network. Each network of the one or more networks 180 may include hubs, bridges, routers, switches, and wired transmission media such as a wired network or direct-wired connection. The one or more networks 180 may include an extranet or other private network for securely sharing information or providing controlled access to applications or files.

A server, such as server 160, may allow a client to download information (e.g., executable, text, audio, image, and video files) from the server or to perform a search query related to particular information stored on the server. In some cases, server 160 may act as an application server or a file server. In general, a "server" may include a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

One embodiment of server 160 includes a network interface 165, processor 166, and memory 167, all in communication with each other. Network interface 165 allows server 160 to connect to one or more networks 180. Network interface 165 may include a wireless network interface, a modem, and/or a wired network interface. Processor 166 allows server 160 to execute computer readable instructions stored in memory 167 in order to perform processes discussed herein. Processor 166 may include one or more processing units, such as one or more CPUs and/or one or more GPUs. Memory 167 may comprise one or more types of memory (e.g., RAM, SRAM, DRAM, ROM, EEPROM, Flash, etc.). Memory 167 may comprise a hardware storage device. In some cases, the server 160 may establish a secure connection with one or more computing devices (e.g., using a virtual private network connection). Processor 166 may comprise one or more processing elements (e.g., one or more CPUs). In one embodiment, server 160 may store data in a database 169 or acquire data to be processed from the database 169. The stored data associated with database 169 may reside in memory 167.

The networked computing environment 100 may provide a cloud computing environment for one or more computing devices. Cloud computing may refer to Internet-based computing, wherein shared resources, software, and/or information are provided to one or more computing devices on-demand via the Internet (or other global network). The term "cloud" is used as a metaphor for the Internet, based on the cloud drawings used in computer networking diagrams to depict the Internet as an abstraction of the underlying infrastructure it represents. The networked computing environment may comprise a cloud computing environment providing Software-as-a-Service (SaaS) or Infrastructure-as-a-Service (Iaas) services. Saas may refer to a software distribution model in which applications are hosted by a service provider and made available to end users over the Internet.

The federated identity provider 120 may comprise a server for authenticating a user identity or for generating and transmitting a single sign-on token or security token associated with a user identity. One embodiment of federated identity provider 120 includes a network interface 125, processor 126, and memory 127, all in communication with each other. Network interface 125 allows federated identity provider 120 to connect to one or more networks 180. Network interface 125 may include a wireless network interface, a modem, and/or a wired network interface. Processor 126 allows federated identity provider 120 to execute computer readable instructions stored in memory 127 in order to perform processes discussed herein. Processor 126 may include one or more processing units, such as one or more CPUs and/or one or more GPUs. Memory 127 may comprise one or more types of memory (e.g., RAM, SRAM, DRAM, ROM, EEPROM, Flash, etc.). Memory 127 may comprise a hardware storage device.

The computing device 140 may comprise a mobile computing device, a non-mobile computing device, a server, a workstation, a laptop computer, a tablet computer, a desktop computer, or an information processing system. One embodiment of computing device 140 includes a network interface 145, processor 146, memory 147, and display 150, all in communication with each other. Network interface 145 allows computing device 140 to connect to one or more networks 180. Network interface 145 may include a wireless network interface, a modem, and/or a wired network interface. Processor 146 allows computing device 140 to execute computer readable instructions stored in memory 147 in order to perform processes discussed herein. Processor 146 may include one or more processing units, such as one or more CPUs and/or one or more GPUs. Memory 147 may comprise one or more types of memory (e.g., RAM, SRAM, DRAM, ROM, EEPROM, Flash, etc.). Memory 147 may comprise a hardware storage device. Display 150 may display digital images and/or videos. Display 150 may comprise a touchscreen display. In some embodiments, various components of computing device 140 including the network interface 145, processor 146, and memory 147 may be integrated on a single chip substrate. In one example, the network interface 145, processor 146, and memory 147 may be integrated as a system on a chip (SOC). In other embodiments, the network interface 145, processor 146, and memory 147 may be integrated within a single package.

In some embodiments, networked computing environment 100 may provide remote access to secure documents and applications to employees of a company (or members of an organization) in order to allow them to work without being physically present at a company location (e.g., to enable an employee to work from home or while traveling). To facilitate remote access to the secure documents and applications, a secure network connection may be established using a virtual private network (VPN). A VPN connection may allow an employee to securely access or transmit data from a private network (e.g., from a company file server or mail server) using an unsecure public network or the Internet. The VPN connection typically requires client-side software (e.g., running on the employee's remote computing device) to establish and maintain the VPN connection. The VPN client software may provide data encryption and encapsulation prior to the transmission of secure private network traffic through the Internet.

In some embodiments, data center 150 may include an access control application for managing access to protected resources, such as protected applications, databases, or files located within the data center. An access control system may comprise an access control application running on one or more processors. The access control application may be executed using a server, such as server 158 or server 160. In one embodiment, an access control application running on server 160 may control access to a protected application running on server 158. The access control application may be used to detect anomalies related to access control events. An access control event may comprise a request for access to a protected resource, such as a request to access a protected application or to execute the protected application. In some embodiments, the access control application may acquire a request for access to a protected resource within a computing environment, identify a username associated with the request, authenticate the username (e.g., using federated authentication), acquire contextual information associated with the request for access, acquire a baseline set of rules for the username (e.g., determined based on a prior history of access requests made by the username), detect a deviation from the baseline set of rules based on the contextual information (e.g., a deviation may comprise a known device requesting access to the protected resource from a new location or from a new network), acquire additional authentication information in response to detecting the deviation, authorize access to the protected resource based on the additional authentication information, generate a log file including the contextual information in response to detecting the deviation, and update the baseline set of rules if an intrusion or attack to the access control system has not been detected within a threshold period of time subsequent to authorizing access to the protected resource. The log file may be stored using a storage device, such as storage device 155. The baseline set of rules for a username may be generated using machine learning techniques applied to prior access requests made by or on behalf of the username. In one example, contextual information stored within the log file may be used as training data for developing the baseline set of rules. The training data may comprise contextual information covering the past 100 access requests made by the username or covering the past two months of access requests made by the username. Given a training data set, a supervised learning process may be used to analyze the training data set and to derive the baseline set of rules for the username from the training data set.

In some cases, contextual information may be derived from data embedded within a message header or an HTTP header received from a computing device requesting access to a protected resource. The HTTP protocol may be used for fetching webpages and other files (e.g., text, software, images, video, audio, and other multimedia files) over the Internet. HTTP comprises a stateless request-response protocol that provides a structure for the message requests sent from clients to servers, and the message responses sent from servers to clients. For example, a client may be a web browser and a server may be an application running on a computing device hosting a web site. The client may submit an HTTP request to the server identified by a particular IP address, which in turn sends an HTTP response message back to the client. Typically, an end user of the HTTP client initiates an HTTP request by typing in a Uniform Resource Locator (URL) or selecting a hypertext link. The HTTP response message may contain information regarding the status of the request and/or the content requested by the client. In some cases, an HTTP header may include contextual information related to an identification of the operating system used by a computing device making an access request and a location of the computing device making the access request. In one embodiment, an access control application may acquire contextual information associated with an access request by extracting the contextual information from an HTTP header transmitted from a computing device. The access control application may derive the time of day associated with the location of the computing device by acquiring time of day information from a time zone converter application that outputs a current time of day given a location.

Figure 2:
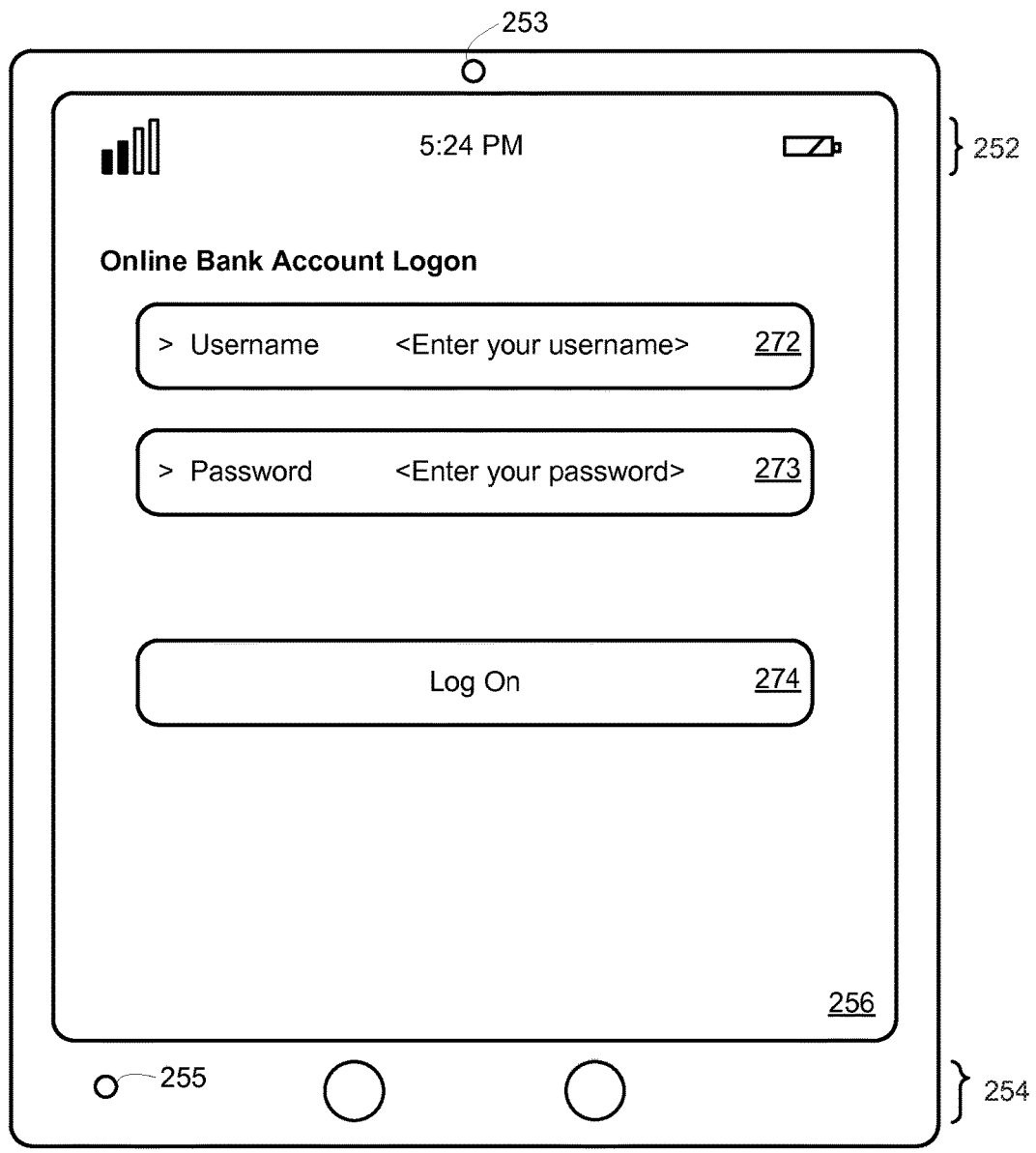
FIG. 2 depicts one embodiment of a mobile device.

FIG. 2 depicts one embodiment of a mobile device 141, such as mobile device 140 in FIG. 1. The mobile device 141 may be used for accessing a webpage for requesting access to a protected application. As depicted, the protected application may relate to an online banking application. In order to access the online banking application, a valid username and password may be entered into the data entry fields 272-273 and submitted via a data submission button 274 (e.g., a touch-sensitive Log On button displayed using the touchscreen display 256). The protected application may become accessible to the mobile device 141 upon authentication of the username by an access control system or application managing access to the online banking application.

The mobile device 141 includes a touchscreen display 256, physical control buttons 254, a microphone 255, and a front-facing camera 253. The touchscreen display 256 may include an LCD display for presenting a user interface to an end user of the mobile device. The touchscreen display 256 may include a status area 252 which provides information regarding signal strength, time, and battery life associated with the mobile device. Status area 252 may also provide information about an authentication level of the mobile device such as whether a particular biometric identification has been made and/or a level of trust associated with the particular biometric identification. In some embodiments, the determination of the authentication level may be based on a number of different biometric identifiers used for identifying an end user of the mobile device and/or a particular location of the mobile device (e.g., the mobile device may be located at the end user's home, office, or other frequently visited or predefined location associated with the end user). The microphone 255 may capture audio associated with the end user (e.g., the end user's voice) for determining the identity of the end user. The front-facing camera 253 may be used to capture images of the end user for determining the identity of the end user. An identity of the end user may be determined by applying facial recognition techniques to a captured image of the end user. In some cases, an access control system or application managing access to the online banking application may require a username, password, and current image capture including a face of an end user of a computing device in order to authenticate the username and to authorize access to the protected application.

Figure 3A:
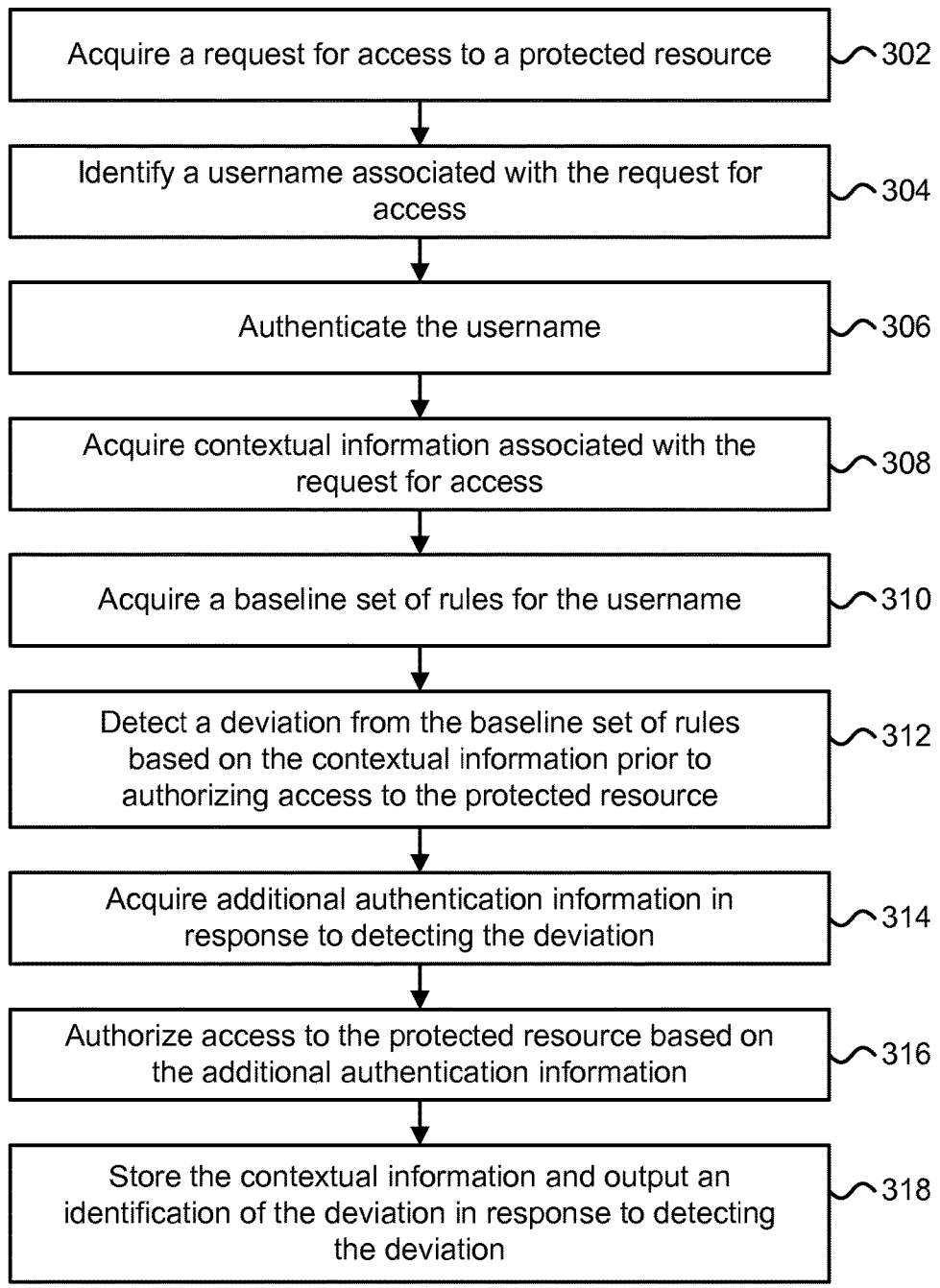
FIG. 3A is a flowchart describing one embodiment of a process for managing access to protected resources within a computing environment.

FIG. 3A is a flowchart describing one embodiment of a process for managing access to protected resources within a computing environment. In one embodiment, the process of FIG. 3A is performed by a server, such as server 160 in FIG. 1.

In step 302, a request for access to a protected resource is acquired. The request for access to the protected resource may comprise a request message sent from a computing device (e.g., a mobile phone) to a server running an access control application, such as server 160 in FIG. 1. The request for access may derive from an end user entering a username and password into data entry fields of a webpage or mobile application in order to access a protected application hosted by a computing environment. The protected resource may comprise a protected network within a computing environment, a protected server within the computing environment, a protected storage device within the computing environment, a protected database within the computing environment, a protected application provided by the computing environment, or a protected database stored within the computing environment.

In step 304, a username associated with the request for access is identified. The username may be provided to an access control application as data submitted via an input data entry field of a webpage or mobile application. In step 306, the username is authenticated. In one embodiment, the username may be authenticated when a valid username for accessing the protected resource is matched with a valid password for the username. In another embodiment, the username may be authenticated using federated authentication. In one example, the username may be authenticated by a third party via the transmission of a security token associated with the authentication of the username by the third party.

In step 308, contextual information associated with the request for access is acquired. The contextual information may comprise an identification of the device making the request for access, an identification of the operating system used by the device making the request for access, a location of the device making the request for access (e.g., an identification of a city or zip code), a time of day associated with the location of the device making the request for access, or whether a particular cookie is stored on the device making the request for access. In some cases, the contextual information may be derived from data embedded within an HTTP header received from the computing device making the request for access to the protected resource. The HTTP header may include a geolocation header or location information associated with a location of the computing device making the request for access. The HTTP header may include a user-agent header that includes originating device information such as an operating system or a web browser used by the computing device making the request for access. In one embodiment, an access control application may acquire contextual information associated with an access request by extracting the contextual information from an HTTP header transmitted from a computing device. The access control application may derive the time of day associated with the location of the computing device by acquiring time of day information from a time zone converter application that outputs a current time of day given a location.

In step 310, a baseline set of rules for the username is acquired. The baseline set of rules for the username may be acquired from a baseline user context database that stores contextual information for access requests made by the username and baselines rules generated from the stored contextual information. The baseline user context database may be stored on a server, such as server 160 in FIG. 1, or on a storage device, such as storage device 155 in FIG. 1. The baseline set of rules for the username may be generated using machine learning techniques applied to prior access requests made by or on behalf of the username. In one example, contextual information stored within a log file or auditing file may be used as training data for developing the baseline set of rules. The training data may comprise contextual information covering the past 500 access requests made by the username (e.g., covering a previous number of access requests) or covering the past six months of access requests made by the username (e.g., covering a previous period of time). Given a training data set, a supervised learning process may be used to analyze the training data set and to derive the baseline set of rules for the username from the training data set.

In step 312, a deviation from the baseline set of rules is detected prior to authorizing access to the protected resource based on the contextual information. In one embodiment, a deviation from the baseline set of rules may comprise a computing device requesting access to the protected resource from a new location, from a new geolocation, or from a new network not covered by the baseline set of rules. In one example, the baseline set of rules for the username may specify that the username has only previously requested access to the protected resource from a first network (e.g., a work network) and the deviation may be detected if the access request derives from a second network different from the first network (e.g., a home network or a public network outside of the work environment). In another example, the baseline set of rules for the username may specify that the username has previously requested access from either a first location (e.g., a work location located in a first city) or a second location (e.g., a home location located in a second city) and the deviation may be detected if the access request originates from a third location different from the second location and the first location (e.g., the access request originates from a new location located outside of the country or the state in which the first location and the second location exist). In another example, the baseline set of rules for the username may specify that the username has previously requested access from computing devices using an operating system of a first type and the deviation may be detected if the access request derives from a computing device using an operating system of a second type different from the first type. In another example, the baseline set of rules for the username may specify that the username has previously requested access from computing devices using a web browser of a first type and the deviation may be detected if the access request derives from a computing device using a web browser of a second type different from the first type.

In step 314, additional authentication information is acquired in response to detecting the deviation. The additional authentication information may comprise additional multi-factor authentication information, such as an answer to a challenge question. In some cases, if a deviation has been detected prior to access being authorized to a protected resource, then an additional authentication challenge request may be transmitted to the computing device making the access request and a correct answer to the additional authentication challenge must be provided prior to access being granted to the protected resource (e.g., an additional challenge-response authentication procedure may be required before access is granted to the protected resource). In one example, if a laptop computer or mobile phone has been stolen from an employee by an adverse party, then the adverse party may attempt to access the protected resource using a computing device that is commonly used by the employee to access the protected resource and the computing device may include automatically filled-in or easily accessible username and password information for accessing the protected resource. However, if the stolen computing device is requesting access from a new location or from a new network that has not previously been used by the employee, then the access control system may transmit an additional challenge to the computing device or may request additional authentication information. If a correct answer is provided by the computing device, then access may be granted to the protected resource.

In step 316, access to the protected resource is authorized based on the additional authentication information. In one example, authorization to a protected file or application may be granted upon confirmation of the additional authentication information. In step 318, the contextual information is stored and an identification of the deviation is outputted in response to detecting the deviation. The contextual information may be stored in a log file. The contextual information may be tagged or indexed with an identification of the request for access (e.g., identified using a unique access request number or a time stamp for when the access request was received). The identification of the deviation may be outputted to a system administrator or a member of an IT team. The identification of the deviation may be outputted by transmitting the identification of the deviation via email or text.

Figure 3B:
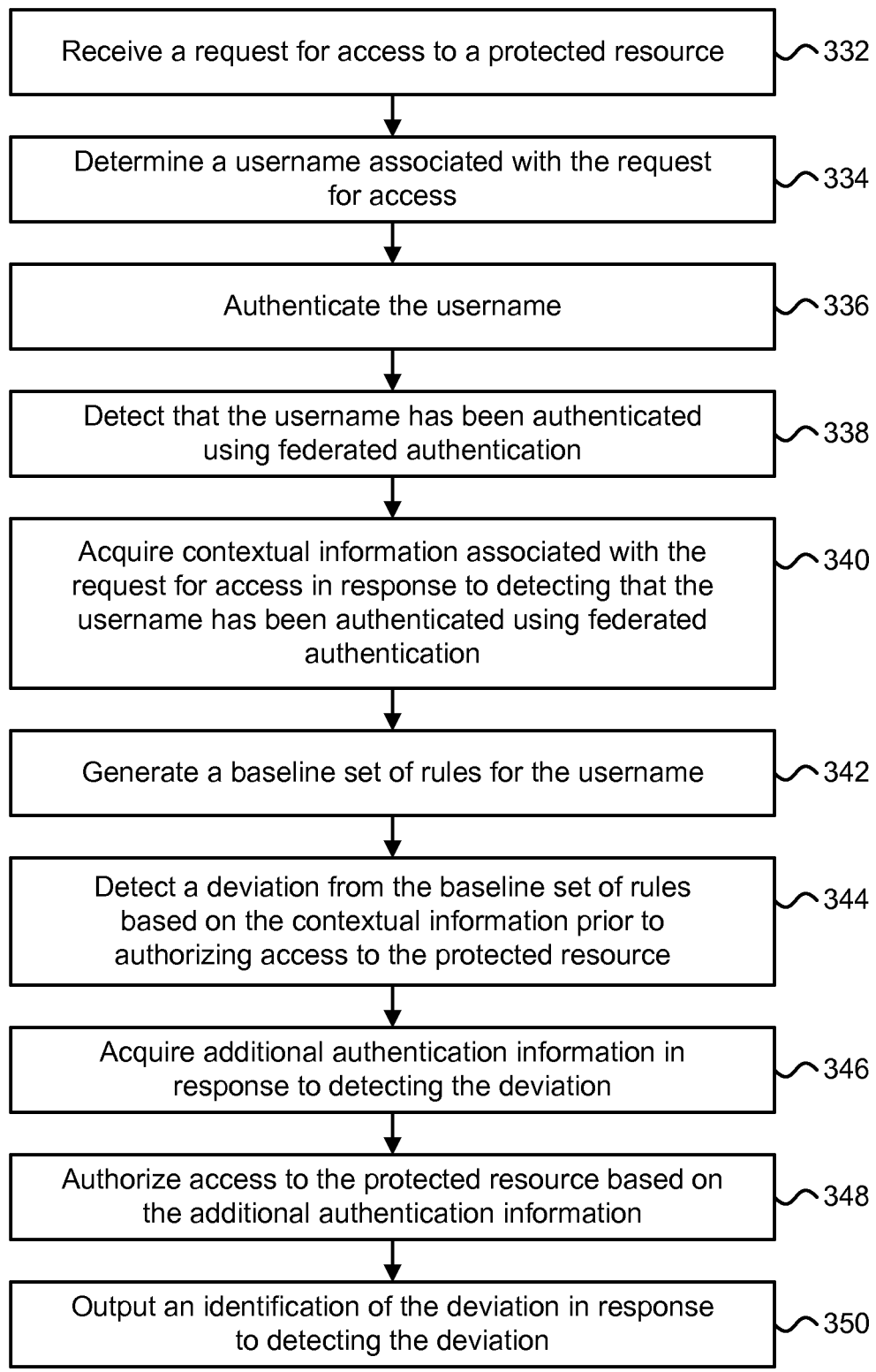
FIG. 3B is a flowchart describing an alternative embodiment of a process for managing access to protected resources within a computing environment.

FIG. 3B is a flowchart describing an alternative embodiment of a process for managing access to protected resources within a computing environment. In one embodiment, the process of FIG. 3B is performed by a server, such as server 160 in FIG. 1.

In step 332, a request for access to a protected resource is received. The request for access to the protected resource may comprise a request message sent from a computing device (e.g., a tablet computer) to a server running an access control application, such as server 160 in FIG. 1. The request for access may derive from an end user entering a username and password into data entry fields of a webpage or mobile application in order to access a protected application hosted by a computing environment. The protected resource may comprise a protected network within a computing environment, a protected server within the computing environment, a protected storage device within the computing environment, a protected database within the computing environment, a protected application provided by the computing environment, or a protected database stored within the computing environment.

In step 334, a username associated with the request for access is determined. The username may be determined by an access control application based on data submitted via an input data entry field of a webpage or mobile application. In step 336, the username is authenticated using federated authentication. In one embodiment, the username may be authenticated by a third party via the transmission of a security token associated with the authentication of the username by the third party. In step 338, is detected that the username has been authenticated using federated authentication by a third party. In one embodiment, the username may be authenticated by a security domain that is independent from or outside of a computing environment in which the protected resource exists.

In step 340, contextual information associated with the request for access is acquired in response to detecting that the username has been authenticated using federated authentication. The contextual information may comprise an identification of the device making the request for access, an identification of the operating system used by the device making the request for access, a location of the device making the request for access (e.g., an identification of a city or zip code), a time of day associated with the location of the device making the request for access, or whether a particular cookie is stored on the device making the request for access. In some cases, the contextual information may be derived from data embedded within a message header received from the computing device making the request for access to the protected resource. The message header may comprise an HTTP header. The message header may include a geolocation header or location information associated with a location of the computing device making the request for access. The message header may include a user-agent header that includes originating device information such as an operating system or a web browser used by the computing device making the request for access. In one embodiment, an access control application may acquire contextual information associated with an access request by extracting the contextual information from a message header transmitted from a computing device. The access control application may derive the time of day associated with the location of the computing device by acquiring time of day information from a time zone converter application that outputs a current time of day given a location.

In step 342, a baseline set of rules for the username is generated. The baseline set of rules for the username may be generated using machine learning techniques applied to prior access requests made by or on behalf of the username. In one example, contextual information stored within a log file or auditing file may be used as training data for developing the baseline set of rules. The training data may comprise contextual information covering the past 1000 access requests made by the username (e.g., covering a previous number of access requests) or covering the past three months of access requests made by the username (e.g., covering a previous period of time). Given a training data set, a supervised learning process may be used to analyze the training data set and to derive the baseline set of rules for the username from the training data set.

In step 344, a deviation from the baseline set of rules is detected prior to authorizing access to the protected resource based on the contextual information. In one embodiment, a deviation from the baseline set of rules may comprise a computing device requesting access to the protected resource from a new location, from a new geolocation, or from a new network not covered by the baseline set of rules. In one example, the baseline set of rules for the username may specify networks previously used by the username to request access to a protected resource and the deviation may be detected if the request for access derives from a new network different from any network specified in the baseline set of rules. In another example, the baseline set of rules for the username may specify a list of locations previously used by the username to request access to a protected resource and the deviation may be detected if the access request originates from a new location different from any of the locations specified in the baseline set of rules. In some cases, the deviation may be detected if the access request originates from a new location that is greater than a particular distance (e.g., is more than one mile) from any of the locations specified in the baseline set of rules. In another example, the baseline set of rules for the username may specify that the username has previously requested access from computing devices using an operating system of a first type and the deviation may be detected if the access request derives from a computing device using an operating system of a second type different from the first type. In another example, the baseline set of rules for the username may specify that the username has previously requested access from computing devices using a web browser of a first type and the deviation may be detected if the access request derives from a computing device using a web browser of a second type different from the first type.

In step 346, additional authentication information is acquired in response to detecting the deviation. The additional authentication information may comprise additional multi-factor authentication information, such as an answer to a challenge question. In step 348, access to the protected resource is authorized based on the additional authentication information. In one example, authorization to a protected file or application may be granted upon confirmation of the additional authentication information. In step 350, an identification of the deviation is outputted in response to detecting the deviation. The identification of the deviation may be outputted by transmitting the identification of the deviation via email or text, displaying the identification of the deviation using a display, or generating and storing a report including the identification of the deviation.

Figure 3C:
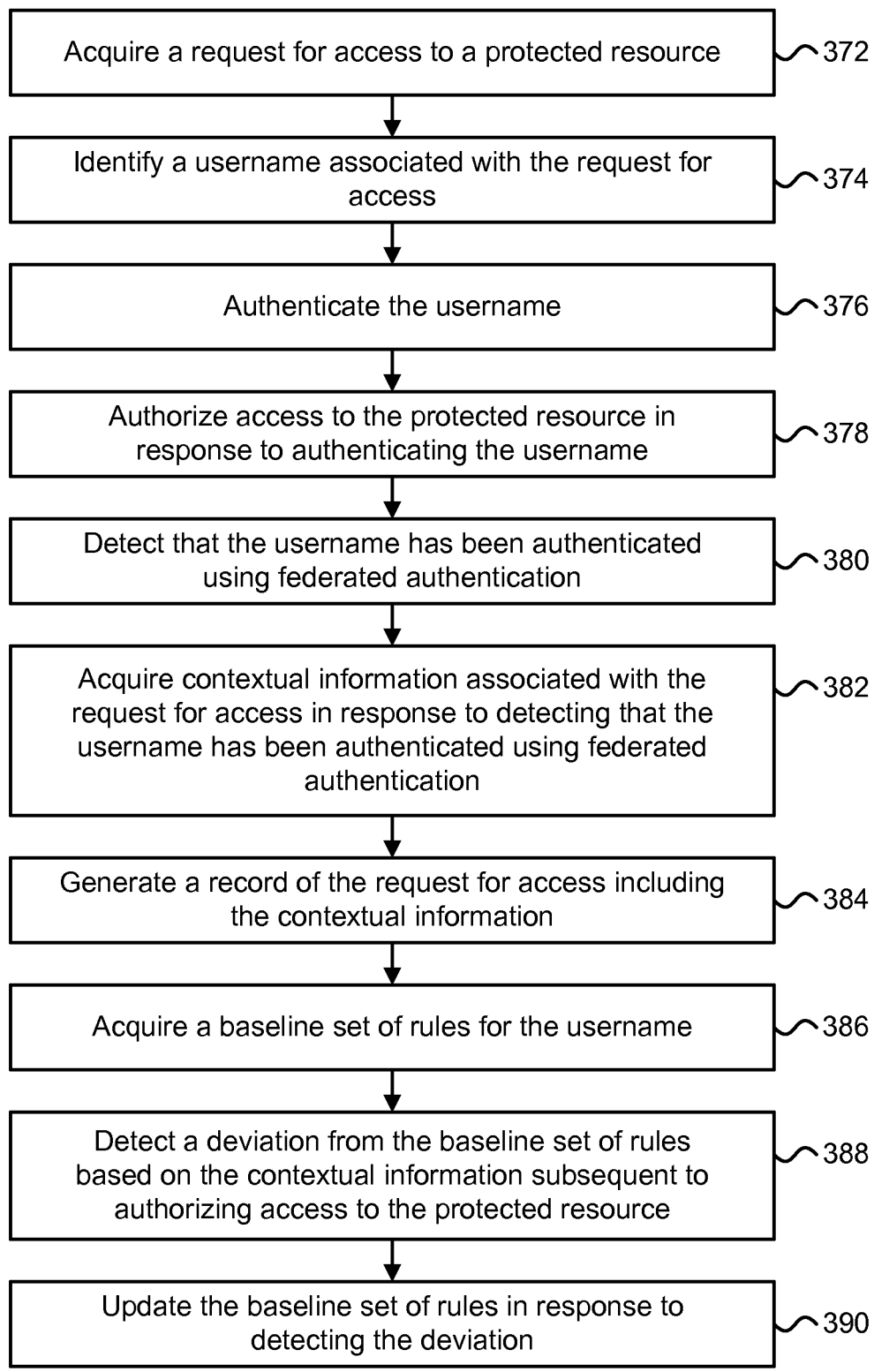
FIG. 3C is a flowchart describing one embodiment of a process for managing access to protected resources within a computing environment that uses federated authentication.

FIG. 3C is a flowchart describing one embodiment of a process for managing access to protected resources within a computing environment that uses federated authentication. In one embodiment, the process of FIG. 3C is performed by a server, such as server 160 in FIG. 1.

In step 372, a request for access to a protected resource is acquired. The protected resource may comprise a file stored within a computing environment, an application provided by the computing environment, or a database accessible via the computing environment. In step 374, a username associated with the request for access is identified. In step 376, the username is authenticated. In one embodiment, the username may be authenticated using federated authentication. In some cases, the username may be authenticated in response receiving a security token associated with the authentication of the username by a third party. In step 378, access to the protected resource is authorized or granted in response to authenticating the username. In step 380, it is detected that the username has been authenticated using federated authentication.

In step 382, contextual information associated with the request for access is acquired in response to detecting that the username has been authenticated using federated authentication. The contextual information may comprise an identification of a computing device from which the request for access originates, an identification of an operating system used by the computing device making the request for access, a location of the computing device making the request for access, a time of day associated with the location of the computing device making the request for access, or whether a particular cookie is stored on the computing device making the request for access. In some cases, the contextual information may be derived from data embedded within a message header received from the computing device making the request for access to the protected resource. The message header may comprise an HTTP header. The message header may include a geolocation header or a user-agent header that includes originating device information such as an operating system or a web browser used by the computing device making the request for access.

In step 384, a record of the request for access is generated including the contextual information. The record may comprise a log file. The log file may include entries associated with each access request made by the username. Each entry may be tagged with a unique access request number or a time stamp of when the corresponding access request was received. In step 386, a baseline set of rules is acquired for the username. The baseline set of rules for the username may be generated using machine learning techniques applied to prior access requests made by or on behalf of the username.

In step 388, a deviation from the baseline set of rules is detected subsequent to authorizing access to the protected resource based on the contextual information. In one embodiment, a deviation from the baseline set of rules may comprise a computing device requesting access to the protected resource from a new location, from a new geolocation, or from a new network not covered or specified by the baseline set of rules. In one example, the baseline set of rules for the username may specify networks previously used by the username to request access to a protected resource and the deviation may be detected if the request for access derives from a new network different from any network specified in the baseline set of rules. In another example, the baseline set of rules for the username may specify a list of locations previously used by the username to request access to a protected resource and the deviation may be detected if the access request originates from a new location different from any of the locations specified in the baseline set of rules. In step 390, the baseline set of rules is updated in response to detecting the deviation.

In some cases, subsequent to detection of the deviation, the baseline set of rules may be updated to incorporate a new user context or new contextual information not included within the baseline set of rules. In one example, the baseline set of rules may be updated to include a new location from which an access request has occurred or to include a new device from which an access request has occurred. In another example, the baseline set of rules may be updated to include a new web browser from which an access request has occurred or to include a new time of day during which an access request has occurred. In some embodiments, the baseline set of rules may be updated only if an intrusion or attack to an access control system or application managing access to the protected resource has not been detected within a threshold period of time subsequent to access to the protected resource being authorized. In one example, the baseline set of rules may be updated if no intrusion or attack has been detected within a threshold time period (e.g., within 24 hours) from access being authorized. In another example, the baseline set of rules may be updated if no intrusion or attack has been detected within a threshold number of access requests from the username (e.g., within the last ten access requests) from access being authorized.

One embodiment comprises receiving a request for access to a protected resource within a computing environment originating from a computing device, the request for access is associated with a username. The method further comprises acquiring a baseline set of rules for the username derived from previous access requests associated with the username, the baseline set of rules comprises a set of locations. The method further comprises acquiring contextual information corresponding with the request for access, the contextual information comprises a location of the computing device. The method further comprises detecting a deviation from the baseline set of rules based on the contextual information, acquiring additional authentication information in response to detecting the deviation, and authorizing access to the protected resource based on the additional authentication information.

One embodiment comprises a storage device and a processor in communication with the storage device. The storage device stores a baseline set of rules associated with a username, the baseline set of rules comprises a set of locations. The processor receives a request for access to a protected resource originating from a computing device, the request for access is associated with the username. The processor acquires contextual information corresponding with the request for access, the contextual information comprises a location of the computing device. The processor detects a deviation from the baseline set of rules based on the contextual information. The processor acquires additional authentication information in response to detecting the deviation. The processor authorizes access to the protected resource based on the additional authentication information.

One embodiment comprises a computer program product comprising a computer readable storage medium having computer readable program code embodied therewith. The computer readable program code configured to receive a request for access to a protected resource originating from a computing device, the request for access is associated with a username. The computer readable program code configured to acquire a baseline set of rules for the username derived from previous access requests associated with the username, the baseline set of rules comprises a set of locations. The computer readable program code configured to acquire contextual information corresponding with the request for access, the contextual information comprises a location of the computing device. The computer readable program code configured to detect a deviation from the baseline set of rules by detecting that the location is more than a threshold distance away from any location of the set of locations. The computer readable program code configured to acquire authentication information in response to detecting the deviation and to authorize access to the protected resource based on the authentication information.

Figure 4:
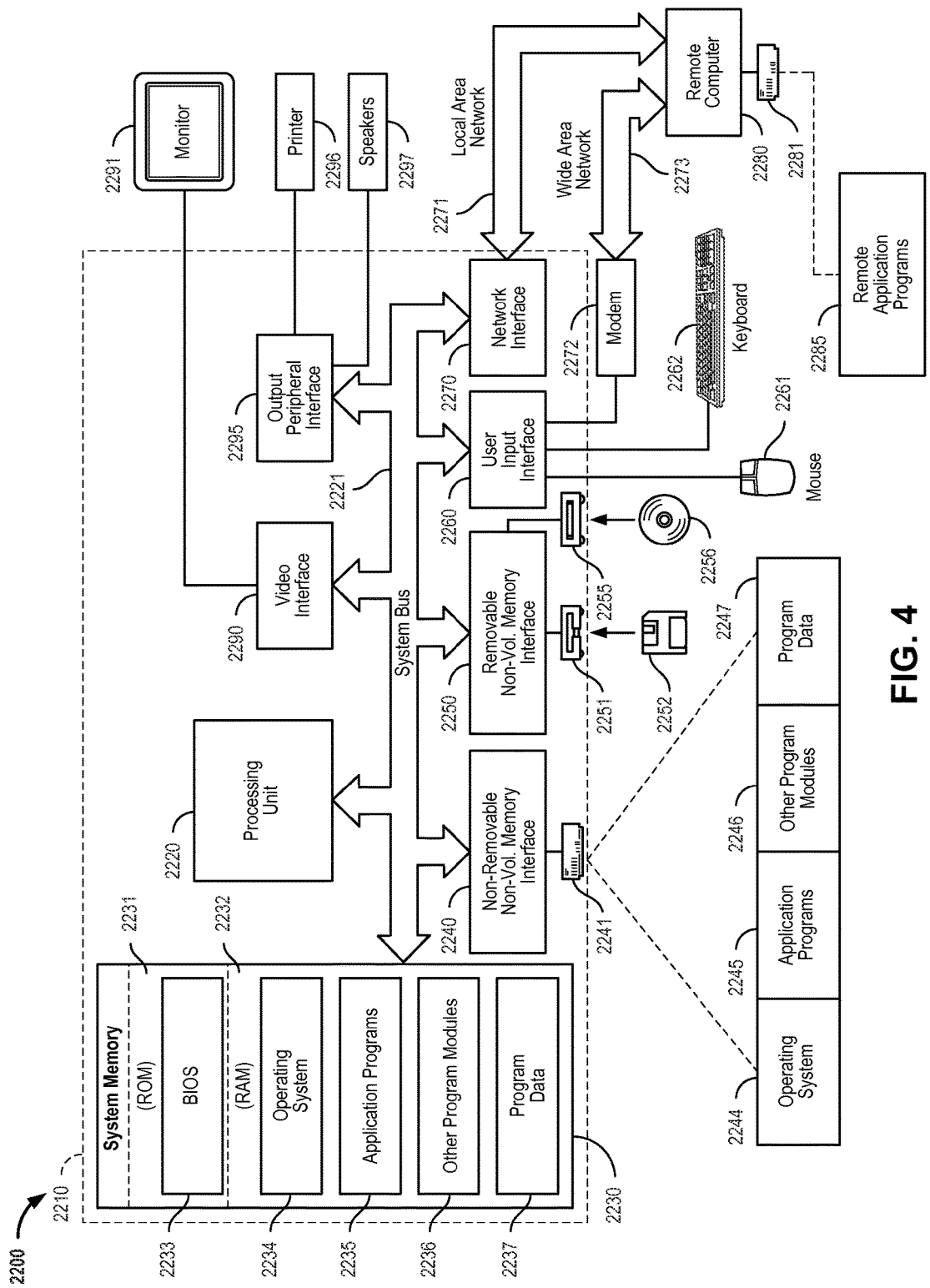
FIG. 4 is a block diagram of an embodiment of a computing system environment.

The disclosed technology may be used with various computing systems. FIG. 4 is a block diagram of an embodiment of a computing system environment 2200, such as server 160 in FIG. 1. Computing system environment 2200 includes a general purpose computing device in the form of a computer 2210. Components of computer 2210 may include, but are not limited to, a processing unit 2220, a system memory 2230, and a system bus 2221 that couples various system components including the system memory 2230 to the processing unit 2220. The system bus 2221 may be any of several types of bus structures including a memory bus, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 2210 typically includes a variety of computer readable media. Computer readable media can be any available media that can be accessed by computer 2210 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 2210. Combinations of the any of the above should also be included within the scope of computer readable media.

The system memory 2230 includes computer storage media in the form of volatile and/or nonvolatile memory such as read only memory (ROM) 2231 and random access memory (RAM) 2232. A basic input/output system 2233 (BIOS), containing the basic routines that help to transfer information between elements within computer 2210, such as during start-up, is typically stored in ROM 2231. RAM 2232 typically contains data and/or program modules that are immediately accessible to and/or presently being operated on by processing unit 2220. The system memory 2230 may store operating system 2234, application programs 2235, other program modules 2236, and program data 2237.

The computer 2210 may also include other removable/non-removable, volatile/nonvolatile computer storage media. The computer 2210 may include a hard disk drive 2241 that reads from or writes to non-removable, nonvolatile magnetic media, a magnetic disk drive 2251 that reads from or writes to a removable, nonvolatile magnetic disk 2252, and an optical disk drive 2255 that reads from or writes to a removable, nonvolatile optical disk 2256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 2241 is typically connected to the system bus 2221 through an non-removable memory interface such as interface 2240, and magnetic disk drive 2251 and optical disk drive 2255 are typically connected to the system bus 2221 by a removable memory interface, such as interface 2250.

The drives and their associated computer storage media described above provide storage of computer readable instructions, data structures, program modules and other data for the computer 2210. Hard disk drive 2241 is illustrated as storing operating system 2244, application programs 2245, other program modules 2246, and program data 2247. Note that these components can either be the same as or different from operating system 2234, application programs 2235, other program modules 2236, and program data 2237. Operating system 2244, application programs 2245, other program modules 2246, and program data 2247 are given different numbers here to illustrate that, at a minimum, they are different copies. A user may enter commands and information into computer 2210 through input devices such as a keyboard 2262 and pointing device 2261, commonly referred to as a mouse, trackball, or touch pad. Other input devices (not shown) may include a microphone, joystick, game pad, satellite dish, scanner, or the like. These and other input devices are often connected to the processing unit 2220 through a user input interface 2260 that is coupled to the system bus, but may be connected by other interface and bus structures, such as a parallel port, game port or a universal serial bus (USB). A monitor 2291 or other type of display device is also connected to the system bus 2221 via an interface, such as a video interface 2290. In addition to the monitor, computers may also include other peripheral output devices such as speakers 2297 and printer 2296, which may be connected through an output peripheral interface 2295.

The computer 2210 may operate in a networked environment using logical connections to one or more remote computers, such as a remote computer 2280. The remote computer 2280 may be a personal computer, a server, a router, a network PC, a peer device or other common network node, and typically includes many or all of the elements described above relative to the computer 2210. The logical connections may include a local area network (LAN) 2271 and a wide area network (WAN) 2273, but may also include other networks. Such networking environments are commonplace in offices, enterprise-wide computer networks, intranets and the Internet.

When used in a LAN networking environment, the computer 2210 is connected to the LAN 2271 through a network interface or adapter 2270. When used in a WAN networking environment, the computer 2210 typically includes a modem 2272 or other means for establishing communications over the WAN 2273, such as the Internet. The modem 2272, which may be internal or external, may be connected to the system bus 2221 via the user input interface 2260, or other appropriate mechanism. In a networked environment, program modules depicted relative to the computer 2210, or portions thereof, may be stored in the remote memory storage device. For example, remote application programs 2285 may reside on memory device 2281. It will be appreciated that the network connections shown are exemplary and other means of establishing a communications link between the computers may be used.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

For purposes of this document, reference in the specification to "an embodiment," "one embodiment," "some embodiments," or "another embodiment" may be used to described different embodiments and do not necessarily refer to the same embodiment.

For purposes of this document, a connection can be a direct connection or an indirect connection (e.g., via another part).

For purposes of this document, the term "set" of objects refers to a "set" of one or more of the objects.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for managing access to protected resources within a computing environment, comprising:
    receiving a request for access to a protected resource within the computing environment originating from a computing device, the request for access is associated with a username, the protected resource comprises a computing application;
    acquiring a baseline set of rules for the username derived from previous access requests associated with the username, the baseline set of rules comprises a set of physical locations;
    acquiring contextual information corresponding with the request for access, the contextual information comprises a geolocation of the computing device;
    detecting a deviation from the baseline set of rules based on the contextual information, the detecting a deviation comprises detecting that the geolocation of the computing device is more than a threshold distance away from any location of the set of physical locations;
    acquiring additional authentication information in response to detecting the deviation;
    authorizing access to the protected resource based on the additional authentication information; and
    automatically updating the baseline set of rules with the geolocation if unauthorized access to the computing application has not been detected within a threshold number of access requests from the username after authorizing access to the protected resource.

2. The method of claim 1, wherein:
    the detecting a deviation comprises detecting that the geolocation of the computing device is more than one mile away from the any of the set of physical locations.

3. The method of claim 1, wherein:
    the threshold distance comprises one mile; and
    the threshold number of access requests comprises ten access requests.

4. The method of claim 1, wherein:
    the contextual information further comprises an identification of an operating system used by the computing device; and
    the detecting a deviation comprises detecting that the operating system used by the computing device is different from any operating system specified in the baseline set of rules.

5. The method of claim 1, wherein:
    the contextual information further comprises an identification of a web browser used for submitting the request for access; and
    the detecting a deviation comprises detecting that the web browser is different from any web browser specified in the baseline set of rules.

6. The method of claim 1, further comprising:
    detecting that the username has been authenticated using federated authentication, the acquiring contextual information corresponding with the request for access is performed in response to detecting that the username has been authenticated using federated authentication.

7. The method of claim 1, wherein:
    the acquiring additional authentication information comprises transmitting an authentication challenge request to the computing device and receiving a valid answer to the authentication challenge request from the computing device.

8. The method of claim 1, further comprising:
    generating the baseline set of rules by applying machine learning techniques to a training data set, the training data set comprises a first set of contextual information associated with the previous access requests associated with the username.

9. The method of claim 1, wherein:
    the acquiring contextual information comprises acquiring the geolocation of the computing device from an HTTP header.

10. The method of claim 1, wherein:
    the protected resource comprises a database; and
    the request for access comprises a request to read data from the database.

11. An access control system, comprising:
    a storage device configured to store a baseline set of rules associated with a username, the baseline set of rules comprises a set of physical locations; and
    a processor configured to receive a request for access to a protected resource that originated from a computing device, the request for access is associated with the username, the protected resource comprises a computing application, the processor configured to acquire contextual information corresponding with the request for access, the contextual information comprises a geolocation of the computing device, the processor configured to detect a deviation from the baseline set of rules based on the contextual information, the processor configured to detect the deviation via detection that the geolocation is more than a threshold distance away from any location of the set of physical locations, the processor configured to acquire additional authentication information in response to detection of the deviation and authorize access to the protected resource based on the additional authentication information, the processor configured to determine that unauthorized access to the computing application has not been detected within a threshold number of access requests from the username subsequent to the authorization of access to the protected resource and update the baseline set of rules with the geolocation in response to the determination that unauthorized access to the computing application has not been detected within the threshold number of access requests from the username subsequent to the authorization of access to the protected resource.

12. The system of claim 11, wherein:
    the processor configured to detect the deviation by detecting that the geolocation of the computing device is more than one mile away from the any of the set of physical locations.

13. The system of claim 11, wherein:
    the threshold distance comprises one mile.

14. The system of claim 11, wherein:
    the contextual information further comprises an identification of an operating system used by the computing device, the processor configured to detect the deviation by detecting that the operating system used by the computing device is different from any operating system specified in the baseline set of rules.

15. The system of claim 11, wherein:
    the contextual information further comprises an identification of a web browser used for submitting the request for access, the processor configured to detect the deviation by detecting that the web browser is different from any web browser specified in the baseline set of rules.

16. The system of claim 11, wherein:
    the processor configured to detect that the username has been authenticated using federated authentication and acquire the contextual information in response to detecting that the username has been authenticated using federated authentication.

17. The system of claim 11, wherein:
the processor configured to determine the geolocation of the computing device using information embedded within an HTTP header;
the protected resource comprises a database; and
the request for access comprises a request to read data from the database.

18. A computer program product, comprising:
a non-transitory computer readable storage medium having computer readable program code embodied therewith, the computer readable program code comprising:
computer readable program code configured to receive a request for access to a protected resource originating from a computing device, the request for access is associated with a username, the protected resource comprises a computing application;
computer readable program code configured to acquire a baseline set of rules for the username derived from previous access requests associated with the username, the baseline set of rules comprises a set of physical locations;
computer readable program code configured to acquire contextual information corresponding with the request for access, the contextual information comprises a geolocation of the computing device;
computer readable program code configured to detect a deviation from the baseline set of rules by detecting that the geolocation is different from any location of the set of physical locations and is more than a threshold distance away from any physical location of the set of physical locations;
computer readable program code configured to acquire authentication information in response to detecting the deviation;
computer readable program code configured to authorize access to the protected resource based on the authentication information; and
computer readable program code configured to automatically update the baseline set of rules with the geolocation if unauthorized access to the computing application has not been detected within a threshold number of access requests from the username subsequent to the access to the protected resource being authorized.

* * * * *